(12) United States Patent
Naccarato

(10) Patent No.: US 10,604,949 B2
(45) Date of Patent: Mar. 31, 2020

(54) TILE LAYING DEVICE USING TILTABLE WHEELED FRAME

(71) Applicant: Giovanni Naccarato, Thunder Bay (CA)

(72) Inventor: Giovanni Naccarato, Thunder Bay (CA)

( * ) Notice: Subject to any disclaimer, the term of this patent is extended or adjusted under 35 U.S.C. 154(b) by 0 days.

(21) Appl. No.: 15/939,966

(22) Filed: Mar. 29, 2018

(65) Prior Publication Data

US 2019/0024392 A1    Jan. 24, 2019

Related U.S. Application Data

(60) Provisional application No. 62/479,481, filed on Mar. 31, 2017.

(51) Int. Cl.
| | |
|---|---|
| *E04F 21/22* | (2006.01) |
| *B62B 1/06* | (2006.01) |
| *B62B 1/04* | (2006.01) |
| *B62B 1/26* | (2006.01) |
| *B62B 5/06* | (2006.01) |
| *E04F 21/18* | (2006.01) |

(52) U.S. Cl.
CPC ............... *E04F 21/22* (2013.01); *B62B 1/04* (2013.01); *B62B 1/042* (2013.01); *B62B 1/06* (2013.01); *B62B 1/268* (2013.01); *B62B 5/06* (2013.01); *E04F 21/1872* (2013.01); *B62B 2202/62* (2013.01); *B62B 2203/30* (2013.01)

(58) Field of Classification Search
CPC ........ E04F 21/22; E04F 12/1888; B62B 1/04; B62B 1/06; B62B 1/268; B62B 5/06; E04G 21/167

USPC ........................................................ 52/749.11
See application file for complete search history.

(56) References Cited

U.S. PATENT DOCUMENTS

| | | | | |
|---|---|---|---|---|
| 3,842,988 | A * | 10/1974 | Russell | B62B 3/108 414/11 |
| 3,885,688 | A * | 5/1975 | Larsen | E01C 19/528 254/124 |
| 3,895,721 | A * | 7/1975 | Russell | B62B 3/108 414/10 |
| 5,863,169 | A * | 1/1999 | Inkeroinen | E04F 21/1888 414/11 |
| 7,156,383 | B1 * | 1/2007 | Jacobs | E04F 21/22 254/11 |
| 2003/0172511 | A1 * | 9/2003 | Thompson | E01C 19/524 29/283 |
| 2013/0062844 | A1 * | 3/2013 | Stevens | B62B 1/06 280/47.26 |

(Continued)

*Primary Examiner* — Brian D Mattei
(74) *Attorney, Agent, or Firm* — Ryan W. Dupuis; Ade + Company Inc.; Kyle R. Satterthwaite

(57) ABSTRACT

A tile laying device has a main frame supported on wheels for rolling movement along a ground surface. A pendulum frame is supported on the main frame to be freely suspended from the main frame while being adjustable in height relative to the ground surface by tilting the main frame about the axis of the wheels. Suction cups on the pendulum frame allow a tile to be coupled to the tiles using vacuum pressure from a vacuum pump on the main frame. The suction cups can be shifted laterally in a direction of the pendulum axis relative to the main frame to assist in aligning a tile on the pendulum frame with a desired placement location for the tile.

16 Claims, 8 Drawing Sheets

(56) References Cited

U.S. PATENT DOCUMENTS

2015/0336272 A1\* 11/2015 Drew ................... B25J 9/1687
156/64
2019/0100888 A1\* 4/2019 Hand ..................... E01C 23/22

\* cited by examiner

TILE LAYING DEVICE USING TILTABLE WHEELED FRAME

This application claims the benefit under 35 U.S.C. 119(e) of U.S. provisional application Ser. No. 62/479,481, filed Mar. 31, 2018.

FIELD OF THE INVENTION

The present invention relates to a tile laying device including a wheeled frame for rolling on a ground surface having at least one suction cup for suspending a tile from the wheeled frame in which the wheeled frame is tiltable for laying the tile on the ground surface.

BACKGROUND

Tiles are a common finishing material for finishing various surfaces including walls and floors in both indoor and outdoor applications. Tiles are typically placed by preparing a base of wet mortar following by depositing the tile onto the wet mortar base. In order to better grip the tiles as they are deposited onto the wet mortar base, it is known to provide handles which are affixed to the tile using suction cups. Larger tiles, for example large landscaping tiles which may be too heavy to handle safely by a single person, can be handled by two persons gripping independent handles secured to opposing ends of the tile; however, regular use of two people to handle each tile when laying a large area of tiles can be costly in terms of labor. Furthermore, even when two persons are available, the two persons must typically be situated at the same side of the area where the tile is to be place in order to avoid stepping on previously laid tiles, such that the persons can still be readily injured due to the requirement for the persons to lean over to one side while supporting the significant weight of the tile.

SUMMARY OF THE INVENTION

According to one aspect of the invention there is provided a tile laying device for laying a tile, the device comprising:

a main frame supported on transport wheels for rolling movement along a ground surface;

at least one suction cup supported on the main frame and being operable so as to retain the tile thereon by vacuum pressure; and a handle supported on the main frame;

the main frame being supported for pivotal movement relative to the transport wheels about a pivot axis of the main frame between a laying position in which said at least one suction cup is substantially at a level of the ground surface and a transport position in which said at least one suction cup is spaced above the level of the ground surface; and the handle being pivotal with the main frame about the pivot axis and being positioned on the main frame so as to be readily gripped by hands of the operator throughout movement of the main frame between the laying position and the transport position.

By providing a main frame which can be readily grasped by an operator to displace tiles on the suction cups from the laying position on the ground to a transport position, the tiles can be readily wheeled into position. The tiles can thus be fully supported on the main frame as they are moved into position and then subsequent deposited into a prepared bed of wet mortar without any strain to the operator.

The transport wheels preferably comprise two wheels supported for rolling movement about the pivot axis of the main frame.

Preferably a plurality of suctions cups are provided on the frame so as to be arranged to support a plurality of independent tiles thereon.

The device may include an upright pendulum frame supporting said at least one suction cup thereon at a bottom end of the pendulum frame, the pendulum frame being supported on the main frame adjacent a top end of the pendulum frame at a location spaced above said at least one suction cup for free pivotal movement of the pendulum frame relative to the main frame about a pendulum axis oriented parallel to the pivot axis of the main frame such that the suction cups are arranged to remain balanced about the pendulum axis in a level orientation as the main frame is pivoted between the laying position and the transport position.

A lateral adjustment linkage may be coupled to the pendulum frame such that said at least one suction cup is adjustable in a direction of the pendulum axis relative to the main frame.

According to a preferred embodiment, the lateral adjustment linkage comprises a shaft supported on the main frame along the pendulum axis upon which the pendulum frame is pivotally supported and a controllable actuator for displacing the pendulum frame laterally in the direction of the pendulum axis relative to the shaft. Preferably the controllable actuator is an electric actuator which can be actuated to displace the pendulum frame in either one of two opposing lateral directions along the shaft.

According to another embodiment, the pendulum frame comprises a header portion defining a top end of the pendulum frame and being supported on the main frame for pivotal movement about the pendulum axis, a footer portion defining a bottom end of the pendulum frame and supporting the suction cups thereon, and the lateral adjustment linkage comprises a pair of parallel link members pivotally coupled between the header portion above and the footer portion below about respective link axes which extend generally in a rolling direction of the wheels and which are arranged to be horizontally oriented in a balanced position of the pendulum frame about the pendulum axis.

An actuator may be operatively connected to the pendulum frame so as to be arranged to control position of the parallel link members relative to the header portion of the pendulum frame and thereby control positioning of suction cups relative to the main frame in a lateral direction of the pivot axis of the main frame.

The handle may include a rotatable handle grip supported rotatably on the main frame, and the actuator may comprise a dual cable actuator operatively connected between the rotatable handle grip on the main frame and the parallel link members such that a rotation of the handle grip in a first direction of rotation displaces the suction cups relative to main frame in a first lateral direction and a rotation of the handle grip in a second direction of rotation displaces the suction cups relative to main frame in a second lateral direction.

The device may further include: (i) a vacuum source supported on the main frame and arranged to produce a vacuum pressure; and (ii) a controller operatively connected between the vacuum source and said at least one suction cup so as to be arranged to selectively apply the vacuum pressure to said at least one suction cup so as to selectively retain the tile on the main frame only when the vacuum pressure is applied to said at least one suction cup by the controller.

When there is a pair of suction cups on the frame, the pair of suction cups are preferably arranged to be selectively disconnected from the vacuum source by the controller independently of one another.

When there is a handle grip on the main frame at a top end of the main frame for gripping by a user, the device may further include (i) a first actuator button on the main frame in proximity to the handle grip for operating the vacuum source to produce the vacuum pressure when depressed by the user, and (ii) a second actuator button on the main frame in proximity to the handle grip for operating a valve to release the vacuum pressure from the suction cups when depressed by the user.

The main frame may include a first frame portion protruding forwardly from the pivot axis which supports said at least one suction cup thereon at a location spaced forwardly from the transport wheels and a second frame portion extending upwardly and rearwardly from the transport wheels to support the handle thereon.

The handle is preferably supported at a top end of the second frame portion of the main frame.

The vacuum pump may be supported on the first frame portion at a location which is forward of the pivot axis of the main frame.

Preferably the first and second frame portions are foldable relative to one another about the pivot axis of the main frame into a storage position to reduce an overall length of the main frame in a longitudinal direction of rolling movement of the wheels. In this instance, a brace member may be removably attached between the first and second frame portions in a working position such that the first and second frame portions are fixed at an obtuse angle relative to one another about the pivot axis, in which the brace member is adjustably mounted to at least one of the frame portions so as to vary the obtuse angle about which the first and second frame portions are fixed in the working position.

According to a second aspect of the present invention a tile laying device for laying a tile, the device comprising:

a main frame supported on transport wheels for rolling movement along a ground surface;

a shaft horizontally supported on the main frame so as to be adjustable in height relative to the ground surface;

a pendulum frame pivotally supported on the shaft for free pivotal movement of the pendulum frame relative to the main frame about a pendulum axis of the shaft;

at least one suction cup supported on the pendulum frame and being operable so as to retain the tile thereon by vacuum pressure; and a lateral adjustment linkage coupled to the pendulum frame such that said at least one suction cup is adjustable in a direction of the pendulum axis relative to the main frame.

Preferably, the lateral adjustment linkage comprises a controllable actuator which is actuable to displace the pendulum frame laterally in the direction of the pendulum axis relative to the shaft in either one of two opposing lateral directions along the shaft.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
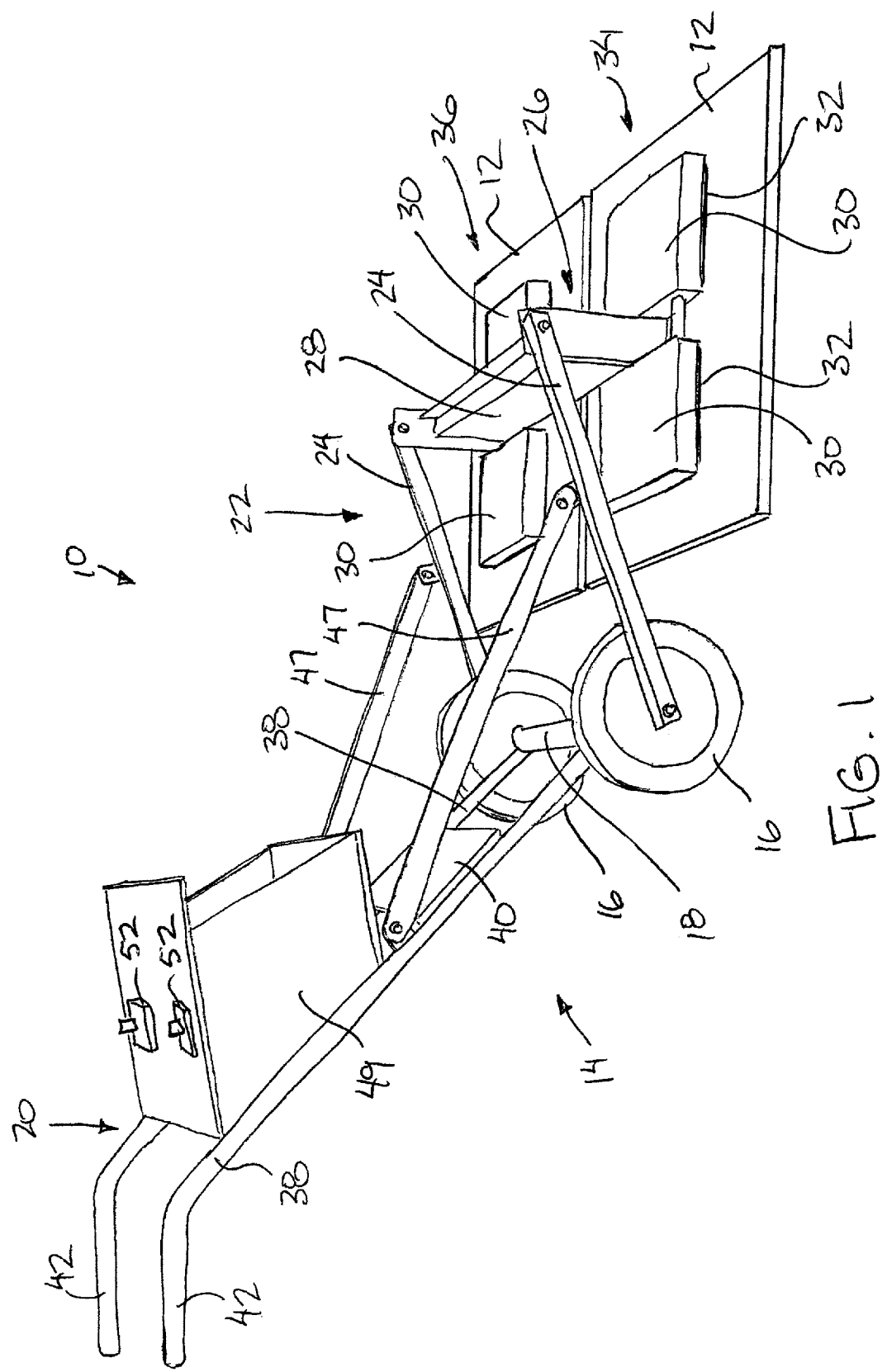
FIG. 1 is perspective view of the tile laying device according to a first embodiment of the present invention.
Figure 2:
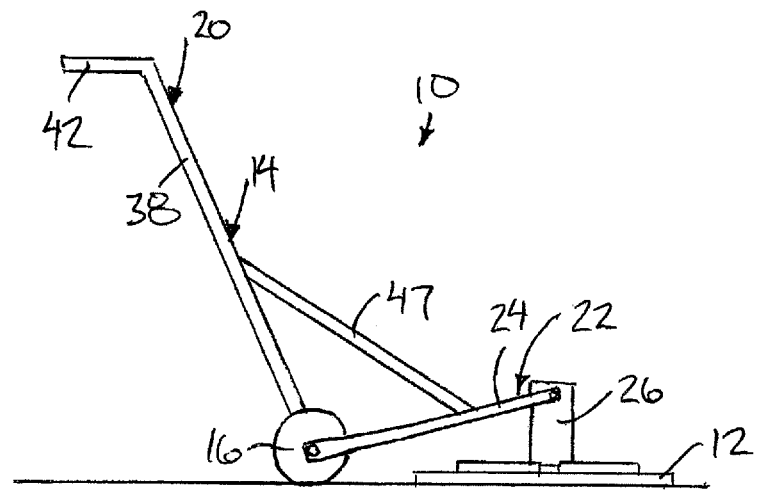
FIG. 2 is a side elevational view of the tile laying device in a laying position according to the first embodiment of FIG. 1.
Figure 3:
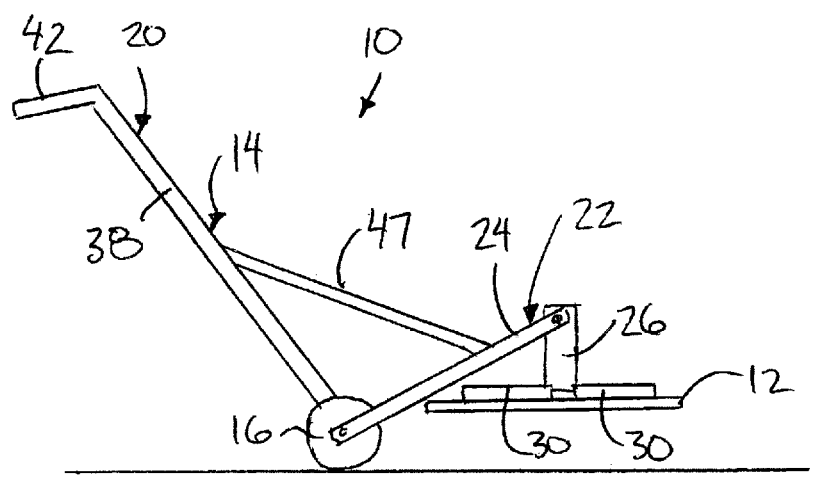
FIG. 3 is a side elevational view of the tile laying device in a transport position according to the first embodiment of FIG. 1.
Figure 4:
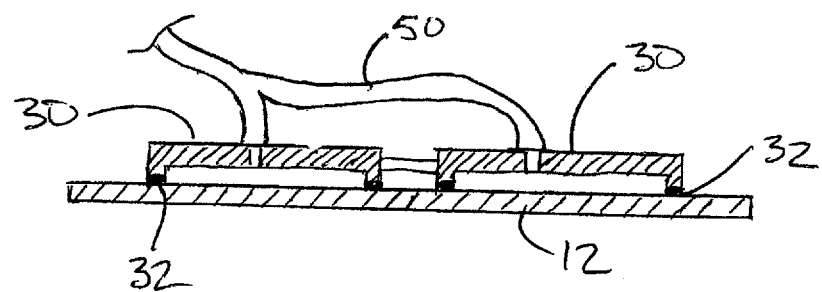
FIG. 4 is a sectional view of a pair of the suction cups of the tile laying device according to the first embodiment of FIG. 1.

Referring to the accompanying figures there is illustrated a tile laying device generally indicated by reference numeral 10. The device 10 is particularly suited for use in supporting large tiles 12 thereon for movement between a transport position in which the tiles are supported for rolling movement along a ground surface and a laying position in which the tiles are supported as they are deposited in a level orientation onto a prepared bed of mortar at the ground surface level.

Although two embodiments are shown in the figures, the features of the first embodiment according to FIGS. 1 through 5 will first be described.

The device 10 generally comprises a main frame 14 supported on two transport wheels 16 for rolling movement in a longitudinal travel direction. The two wheels are supported at laterally opposing sides of the main frame for rotation about a common axis defining a pivot axis about which the main frame is pivotal between the transport position and the laying position.

The main frame includes a crossbar 18 spanning laterally across a width of the main frame at the common axis of the transport wheels for supporting the two wheels at opposing ends of the crossbar for rotation relative to the crossbar. An axle extends axially through the crossbar to support the wheels on opposing ends of the axle for rotation relative to the crossbar.

The main frame 14 further includes a handle frame portion 20 extending generally upwardly and rearwardly from the pivot axis of the transport wheels, and a base frame portion 22 extending generally forwardly from the pivot axis of the transport wheels.

The base frame includes two base members 24 which are supported at laterally opposing sides of the main frame to extend generally forward from opposing ends of the axle supporting the wheels rotatably thereon such that the two base members 24 are parallel and spaced apart from one another within a common plane. Each base member is coupled at a rear end to the axle for relative rotation therebetween about the pivot axis of the wheels. The front ends of the base members 24 are in turn pivotally coupled at opposing sides of a common pendulum frame 26 spanning laterally between the two base members. The pendulum frame 26 comprises a main beam 28 which is elongate in the lateral direction and which is supported to lie parallel to the wheel axis at the front end of the base frame. The pendulum frame is pivotally coupled to the forward ends of the two base members at a top end of the pendulum frame such that the pendulum frame is freely pivotal to dependent downwardly from the pivotal connection to the base frame.

A plurality of suction cups 30 are supported on the pendulum frame so as to be suspended at a location spaced below the pivotal connection of the pendulum frame to the base frame. The suction cups are balanced on the pendulum frame so as to lie in a common substantially horizontal plane when the pendulum frame is freely suspended from the base frame. The suction cups are operable to retain the tiles 14 thereon by vacuum pressure as described in further detail below. More particularly the tiles are supported by the suction cups in a substantially horizontal orientation suspended below the pivotal connection of the pendulum frame to the base frame when the tiles are balanced on the suction cups. The free pivotal movement of the pendulum frame relative to the base frame ensures that the tiles remain supported in a horizontal orientation as the angular orientation of the main frame varies about the pivot axis of the transport wheels between the laying position of FIG. 2 and the transport position of FIG. 3.

Each suction cup 30 comprises a block of rigid material having an internal cavity formed therein which is open to the flat bottom side of the block. A resilient sealing member 32 is provided on the bottom face to extend about a full perimeter of the cavity opening in the bottom side of the block. The resilient sealing member is intended to be engaged upon the upper surface of a tile to be supported on the device. Application of a vacuum pressure to the internal cavity causes the tile to be retained and engagement with the resilient sealing member at the bottom face of the suction cup to retain the tile thereon by vacuum pressure in the usual manner of a suction cup.

The suction cups 30 are provided as an array of four suction cups at four corners of a rectangular perimeter. More particularly the array includes a first set 34 and a second set 36 at laterally opposing right and left sides of the pendulum frame. The two sets are symmetrical relative to one another about a vertical plane which is perpendicular to and laterally centred in the lateral direction of the beam 28. Within each set 34 and 36, there is provided a forward suction cup which is forward of the beam 28 and a rearward suction cup which is rearward of the beam 28 such that the two suction cups within each set are balanced relative to the pivot axis of the pendulum frame longitudinally centred therebetween.

The two suction cups within each set are typically operated together such that vacuum pressure is applied to an removed from the 2 cups simultaneously with one another, but independently of the suction cups of the other set. In this manner one or two tiles may be lifted using a single set of suction cups being operated independent of the other set of suction cups provided that the tile or tiles remain balanced in the longitudinal direction about the pivot axis of the pendulum frame on the base frame. Further details relating to the application of the vacuum pressure to the section cups are described below.

The handle frame portion 20 of the main frame is comprised of two posts 38 which are fixed at their bottom ends onto opposing ends of the crossbar 18 of the frame to extend upwardly and rearwardly therefrom parallel to one another within a common plane at laterally opposing sides of the main frame. The common plane of the handle frame forms an interior angle with the common plane of the base frame which is greater than 90° such that the handle frame maintains a generally upward and rearward inclination away from the pivot axis of the main frame throughout the range of motion of the main frame between the transport and laying positions thereof in which the suction cups are displaced in height from being level with the ground surface in the laying position to being spaced above the ground surface in the transport position.

The orientation of the handle frame relative to the base frame is maintained by a pair of braces 47 supported at laterally opposing sides of the main frame. Each brace 47 is coupled at a rear end at an intermediate location on a respective one of the posts 38 at a location spaced above the wheels, to extend downwardly and forwardly to a forward end coupled at an intermediate location on a respective one of the base members 24 at a location spaced upwardly and forwardly relative to the wheels. The braces form a triangular support structure with the common plane of the base frame portion and the common plane of the handle frame portion to fix the angular orientation of the base frame relative to the handle frame. The connection at one or both ends of each brace 47 may be a pin connection which is readily releasable to permit the base frame to be folded upwardly and rearwardly against a forward side of the handle frame in a stored position to reduce the overall length of the frame if desired.

A crossmember 40 is connected in the lateral direction between the two posts 38 of the handle frame at a location spaced upwardly from the crossbar for added structural support to the handle frame.

A pair of handle grips 42 are also formed at the top ends of the two posts to extend generally horizontally rearward from the top ends of the posts in the laying position of the main frame. Each handle grip 42 is suitably sized to be gripped in a single hand of the user so that the user may readily grip laterally opposing sides of the frame when gripping the two handle grips. The handle grips are situated at the top end of the main frame so as to be well positioned to be readily grasped by the user throughout movement of the main frame between the laying position and the transport position. To displace the main frame from the laying position once a tile has been engaged upon the suction cups up to the transport position, the user merely urges the handle grips downwardly and rearwardly to pivot the frame about the pivot axis of the transport wheels. Once the tiles have been lifted off the ground, the operator can manually wheel the main frame along the ground until the tiles are positioned at a desirable location directly above a bed of wet mortar. The frame can then be pivoted back to the laying position by raising the handles upwardly and forwardly which in turn lowers the pendulum frame suspended pivotally from the front end of the base frame until the tiles are deposited on the ground surface.

To control the application of vacuum pressure to the suction cups, a vacuum pump 44 is provided having an inlet port 46 arranged to produce a vacuum pressure when the pump is operated. A power switch 48 is coupled to the vacuum pump which toggles between an on position and an off position for selectively applying electrical power to the pump to actuate operation of the pump.

A housing 49 is supported on the handle frame portion to span laterally between the two posts 38 at a location spaced upwardly and rearwardly relative to the axis of the transport wheels. The housing 49 locates the vacuum pump therein as well as various valves forming a controller which controls the application of the vacuum pressure from the vacuum pump to the suction cups as described in the following.

More particularly, the inlet port 46 of the vacuum pump is connected to a tee connector 51 which connects two branched lines 50 in parallel with one another to the inlet port 46. The two branched lines 50 communicate between the tee connector 51 and respective ones of the first set 34 and second set 36 of the suction cups respectively. A 3-way valve 52 is connected in series with each branched line 50 between the tee connector 51 and the suction cups.

Each 3-way valve 52 includes a first port 54 in communication with the vacuum pressure generated at the inlet port 46 of the vacuum pump through the tee connector 51, a second port 56 which communicates externally to atmospheric pressure of the surrounding air, and a third port 58 in communication with the remainder of the branched line 50 that communicates with the suction cups 30.

Figure 5:
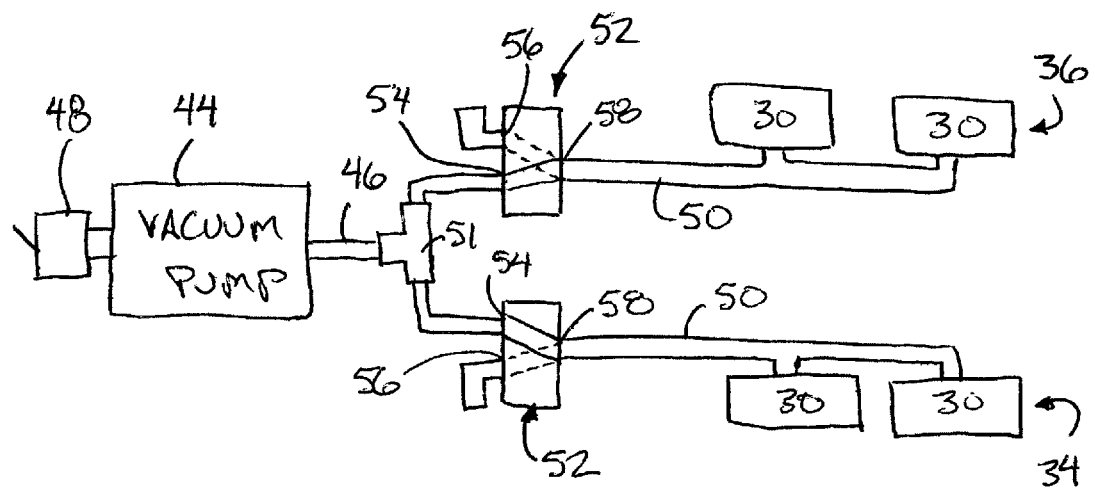
FIG. 5 is a schematic representation of the controller for operating a vacuum source connected to the suction cups according to the first embodiment of FIG. 1.

The 3-way valve 52 is operable between a vacuum position shown in solid line in FIG. 5 for communicating the respective branched line 50 with the vacuum pressure generated at the inlet port 46 of the vacuum pump, and a vented position shown in broken line in FIG. 5 for communicating the respective branched line with the second port 56 for venting the respective suction cups 30 to atmospheric pressure while the first port 54 is sealed closed to maintain vacuum pressure at the tee connector 51 which connects to the first port 54 of the other 3-way valve.

In use, if it is desirable to use only one set of suction cups 30, the vacuum pump 44 is turned on with the switch 48 and the corresponding suction cups 30 are aligned with respective tiles for engaging the sealing member of the suction cup onto the top surface of the tiles. The associated 3-way valve of the selected suction cups is switched to the vacuum position while the other 3-way valve remains in the vented position so that the vacuum pressure can be isolated within the branched line 50 of the selected suction cups 30. Application of the vacuum pressure to the selected suction cups causes the tiles to be retained on the selected suction cups. The user may then pivot the main frame into the transport position for rolling movement along the ground surface until the tiles are aligned at the desired setting location of the tiles. Pivoting the main frame will lower the tiles into the laying position on a bed of wet mortar on the ground surface. The operator can switch the respective 3-way valve 52 back to the vented position to release the tiles from the suction cups.

When it is desirable to use both sets of suction cups 30, the process is substantially identical with the exception of both valves 52 being displaced into the vacuum position thereof once the respective suction cups have been engaged upon the respective tiles to be picked up. Once the main frame has been wheeled to the desirable setting location of the tiles, the tiles are deposited onto the ground surface and both valves are displaced into the vented position to release all of the tiles from the respective suction cups 30.

Figure 6:
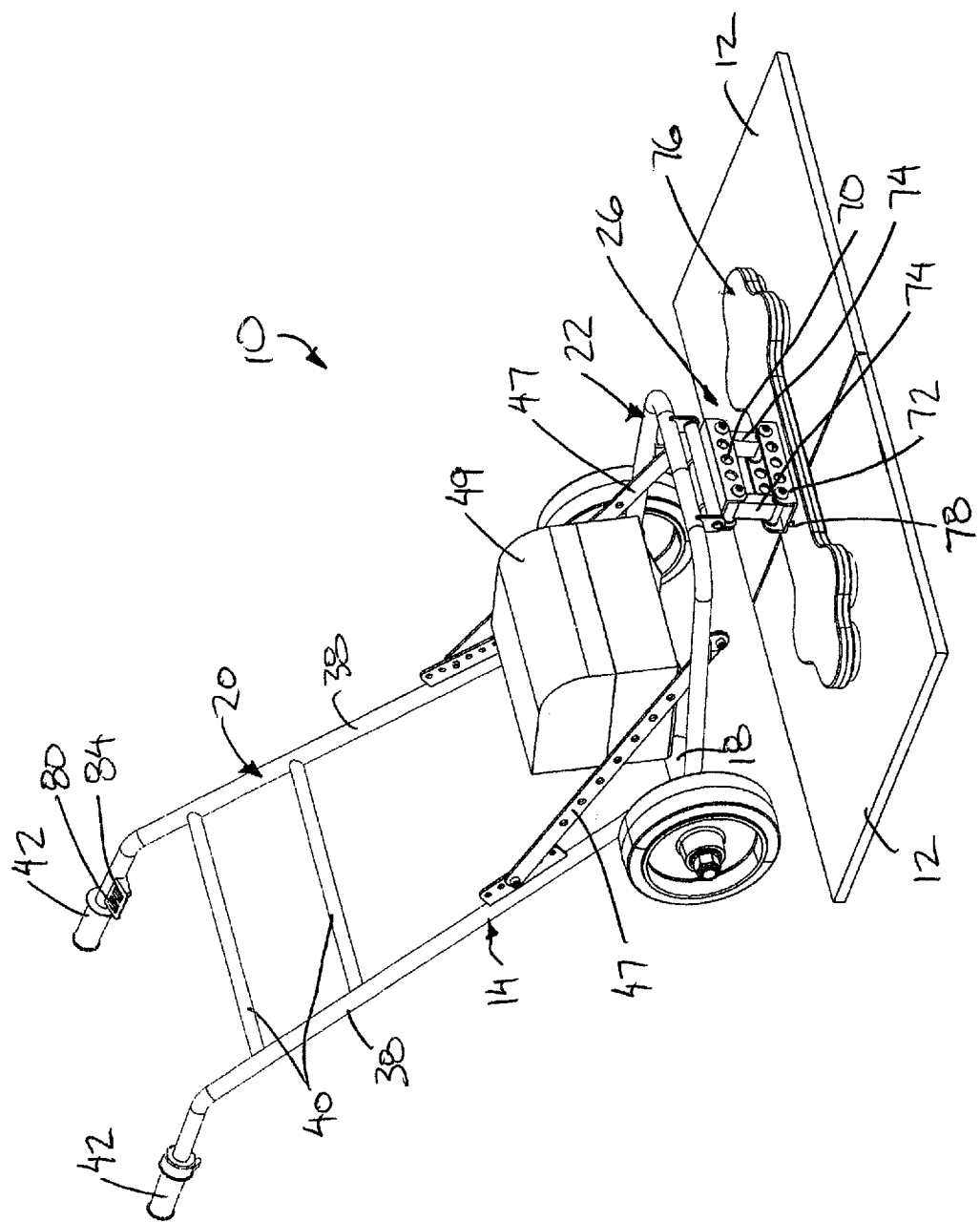
FIG. 6 is a perspective view showing a top side of the tile laying device according to a second embodiment.
Figure 7:
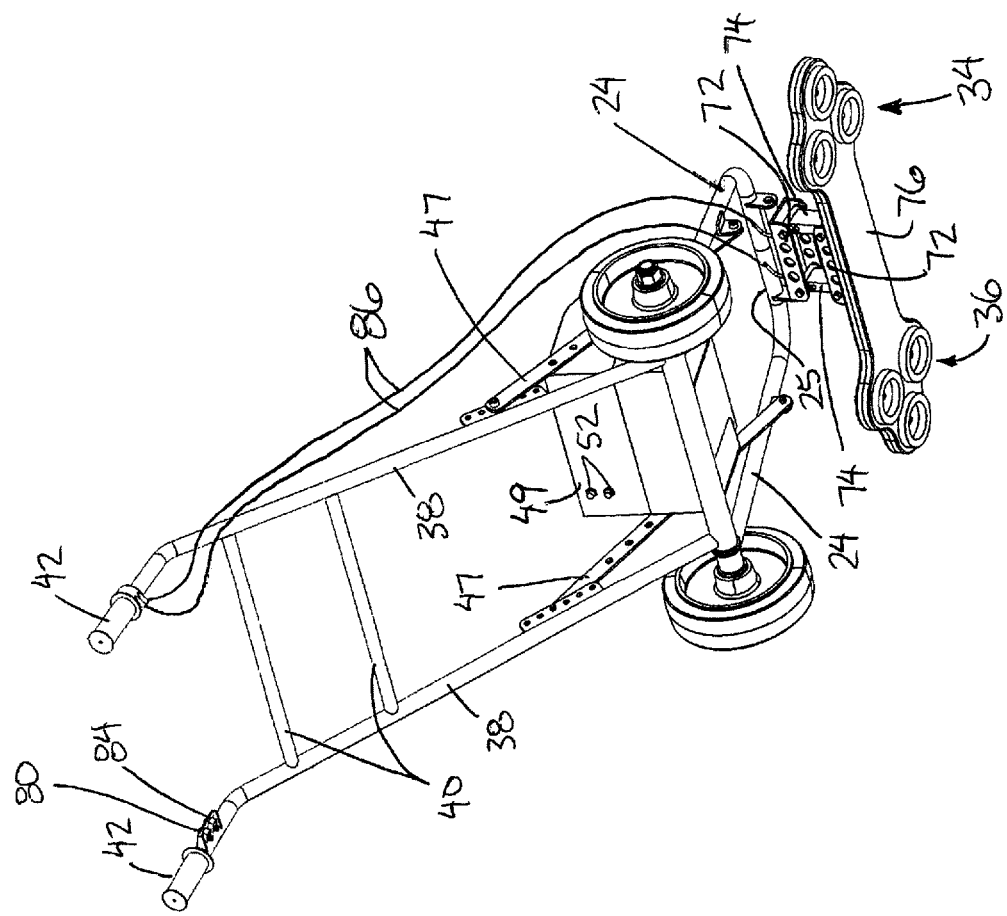
FIG. 7 is a perspective view showing a bottom side of the tile laying device according to the second embodiment of FIG. 6.
Figure 8:
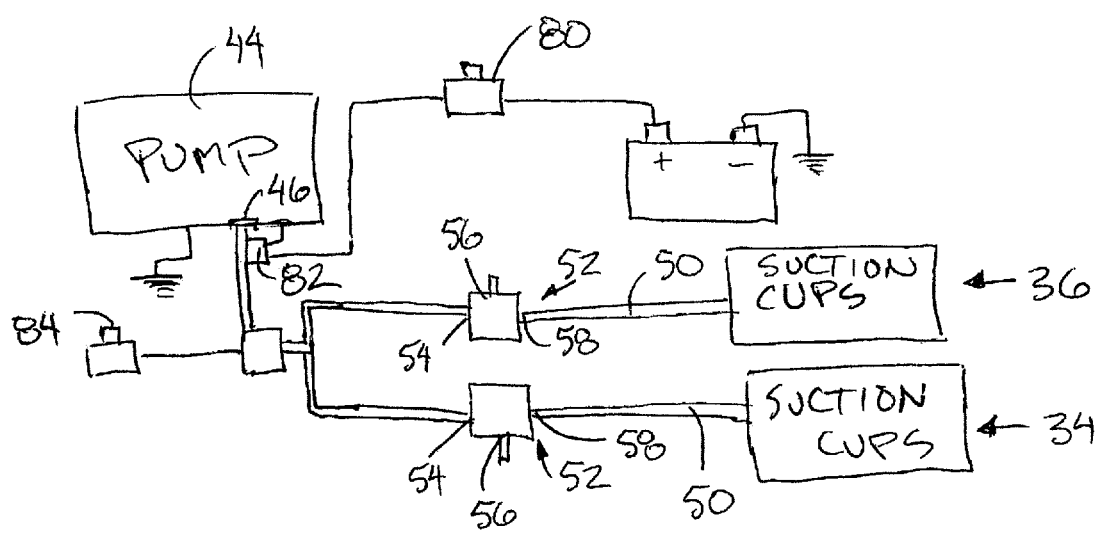
FIG. 8 is a schematic representation of the internal components of the tile laying device according to the second embodiment of FIG. 6.

Turning now to the second embodiment of FIGS. 6 through 8, the device 10 in this instance again includes a main frame 14 formed of (i) a handle frame portion 20 having two posts 38 joined at the bottom end by a crossbar 18 similarly to the first embodiment, and (ii) a base frame portion 22 pivotally supported relative to the handle frame portion about the pivot axis between a working position and a storage position. The base frame portion 22 differs only from the first embodiment in that a crossbar 25 is rigidly connected between the forward ends of the two base frame members 24.

Two brace members 47 are again used it to fix the base frame portion and the handle frame portion at an obtuse angle relative to one another about the pivot axis in the working position. Each brace member 47 is coupled at one end to an intermediate position along respective one of the base members 24 of the base frame portion 22 and at the other end to a selected one of a plurality of mounting locations spaced at longitudinally along a respective one of the posts 38 of the handle frame. Threaded fasteners are used to removably secure the top end of the brace members to respective mounting locations along the posts of the handle frame portion to fix the handle frame portion and the base frame portion relative to one another in the working position. By releasing the fasteners, the brace members 47 can be released from the handle frame portion to be pivoted to lie flat with the base frame portion folded generally in a parallel plane with the handle frame portion to reduce the overall dimensions of the device in the storage position.

Cross members 40 are again provided to connect between the two posts 38 of the handle frame portion for structural stability. Similar to the first embodiment, the inner ends of the base members 24 of the base frame portion are pivotally supported at opposing ends of the crossbar 18 at the bottom of the handle frame portion 20 by receiving a common axle therethrough which supports the two wheels 16 at laterally opposing ends thereof so that the wheels are again rotatable about the pivot axis of the base frame portion relative to the handle frame portion of the main frame.

The pendulum frame 26 in the second embodiment differs from the first embodiment by including a header portion 70 pivotally coupled below the crossbar 25 for relative pivotal movement about a horizontal pendulum axis oriented generally parallel to the pivot axis of the main frame. The header portion 70 defines the top end of the pendulum frame. The pendulum frame further includes two laterally spaced apart link members 74 pivoted at respective top ends at laterally spaced positions on the header portion 70 to depend downwardly therefrom to respective bottom ends which are pivotally coupled at laterally spaced apart positions along a footer portion 72. The footer portion 72 is supported generally parallel to the header portion 70 at a location spaced therebelow and defines the bottom end of the pendulum frame. The pivotal connections at opposing top and bottom ends of both link members 74 allow relative pivotal movement of the link members relative to the header portion and the footer portion about respective link axes oriented generally in the forward rolling direction of the wheels while being oriented to be generally horizontal when the pendulum frame and any tiles supported thereon are balanced about the pendulum axis.

The housing 49, that contains the operating components, in this instance is mounted forwardly of the pivot axis between the base members 24 of the base frame portion. The vacuum pump 74 in the battery for supplying power to the pump are housed within the housing 49. Similarly to the previous embodiments, the suction cups include a first set of suction cups 34 on the right side and a second set of suction cups 36 on the left side of the device. In this instance all of the suction cups are supported on a common solid body 76 which is fixed to the bottom of the footer portion of the pendulum frame. A set of sealing members 32 defines each individual suction cup by protruding from the flat bottom side of the solid body forming the suction cups thereon. Each suction cup is further defined by a hollow cavity in the solid body 76 open to the bottom side of the solid body which is bound by the sealing member 32 about the perimeter thereof for engaging the top surface of a tile to be picked up. Internal channels are formed to communicate between all of the cavities within a common set of suction cups for communicating all of the suction cups of a common set to a respective inlet fitting 78 protruding from the top side of the solid body 76.

A pair of branch lines 50 communicate from the intake fitting 46 of the vacuum pump to respective ones of the inlet fittings 78 of the first and second sets 34 and 36 of suction cups for applying vacuum pressure to the suction cups respectively. Each branch line 50 includes a respective 3-way valve 52 in series therewith having a first port 54 in communication with the vacuum source, a second port 56 vented externally, and a third port 58 communicating with the suction cups of the respective set. Each 3-way valve is manually operable between a first position in which the first port 54 communicates with the third port 58 to apply vacuum pressure from the vacuum pump to the associated set of suction cups, and a second position in which the second port 56 communicates with the third port 58 while sealing the first port 54 to vent the associated suction cups to atmosphere while isolating them from the vacuum pressure in the other branch line.

A first actuator button 80 is provided at the top end of the handle frame portion in proximity to one of the handle grips 42 which is a power switch for the pump. A pressure switch 82 is connected in series with the power supply to the pump which monitors the vacuum pressure within the lines 50 to automatically maintain a prescribed vacuum pressure within the lines when the pump is activated or turned on using the first button 80. A second actuator button 84 is located adjacent the first actuator button 80 adjacent the first handle grip 42 so as to deactivate to the pump and cause the intake fitting 46 of the pump to be vented to atmosphere for breaking the vacuum pressure applied to the suction cups.

According to the second embodiment, an opposing second one of the handle grips 42 is rotatably supported relative to the frame. A dual cable actuator 86 is operatively connected between the rotatable handle grip and the two link members of the pendulum frame. More particularly the dual cable actuator 86 comprises two cables longitudinally slidable within respective sleeves which are operatively connected to the rotatable handle grip 42 such that rotation in a first direction pulls one of the cables from its respective sleeve, whereas rotation in the opposing direction pulls the other cable from its respective sleeve. At the opposing ends of the cables, the sleeve is anchored relative to the header portion of the pendulum frame and the cables are connected to respective ones of the two link members. More particularly the cables are connected to the link member such that pulling on a first one of the cables will pivot the two link members together relative to the header portion in a first direction resulting in displacement of the suction cups in a first lateral direction of the pivot axis, whereas pulling on an opposing second one of the cables will pivot the two link members together relative to the header portion in a second direction resulting in displacement of the suction cups in a second lateral direction of the pivot axis opposite to the first direction. Accordingly pivoting the rotatable handle grip 42 in opposing directions of rotation results in a lateral displacement of the suction cups and the tile supported thereon relative to the main frame in opposing lateral directions respectively.

Operation of the tile laying device 10 according to the second embodiment similarly involves rolling the device across the ground to a pair of tiles to be picked up. The tiles are already suitably spaced relative to one another at the desired spacing corresponding to the installation spacing of the tiles. Engaging the sealing members 32 of the suction cups to the top side of the respective tiles allows the tiles to be picked up when the first button 80 is actuated by the operator to turn on the vacuum pump and apply vacuum pressure to all of the suction cups.

If it is desirable to only use the suction cup that one side of the device, the three way valve 52 of the opposing side can be manually displaced into the second position thereof so that the selected side of the housing remains operational for picking up tiles.

The operator can then pivot the main frame to a transport position to lift the tiles from the ground and then roll the device along the ground to the desired location where the tiles are to be laid. The user pivots the main frame about the pivot axis thereof again towards the laying position with any subsequent alignment of the tiles being enabled by slight forward and back rolling of the device along the ground in one direction, or rotating the rotatable handle grip 42 to position the tiles side to side in a second direction perpendicular to the direction of rolling. Once adequately positioned, the main frame can be further pivoted to the laying position to engage the tiles onto the bed of wet mortar where they are to be installed. The operator then depresses the second button 84 to release the vacuum pressure from the suction cups and release the tiles from the device so that the device can be wheeled away to pick up more tiles.

Figure 9:
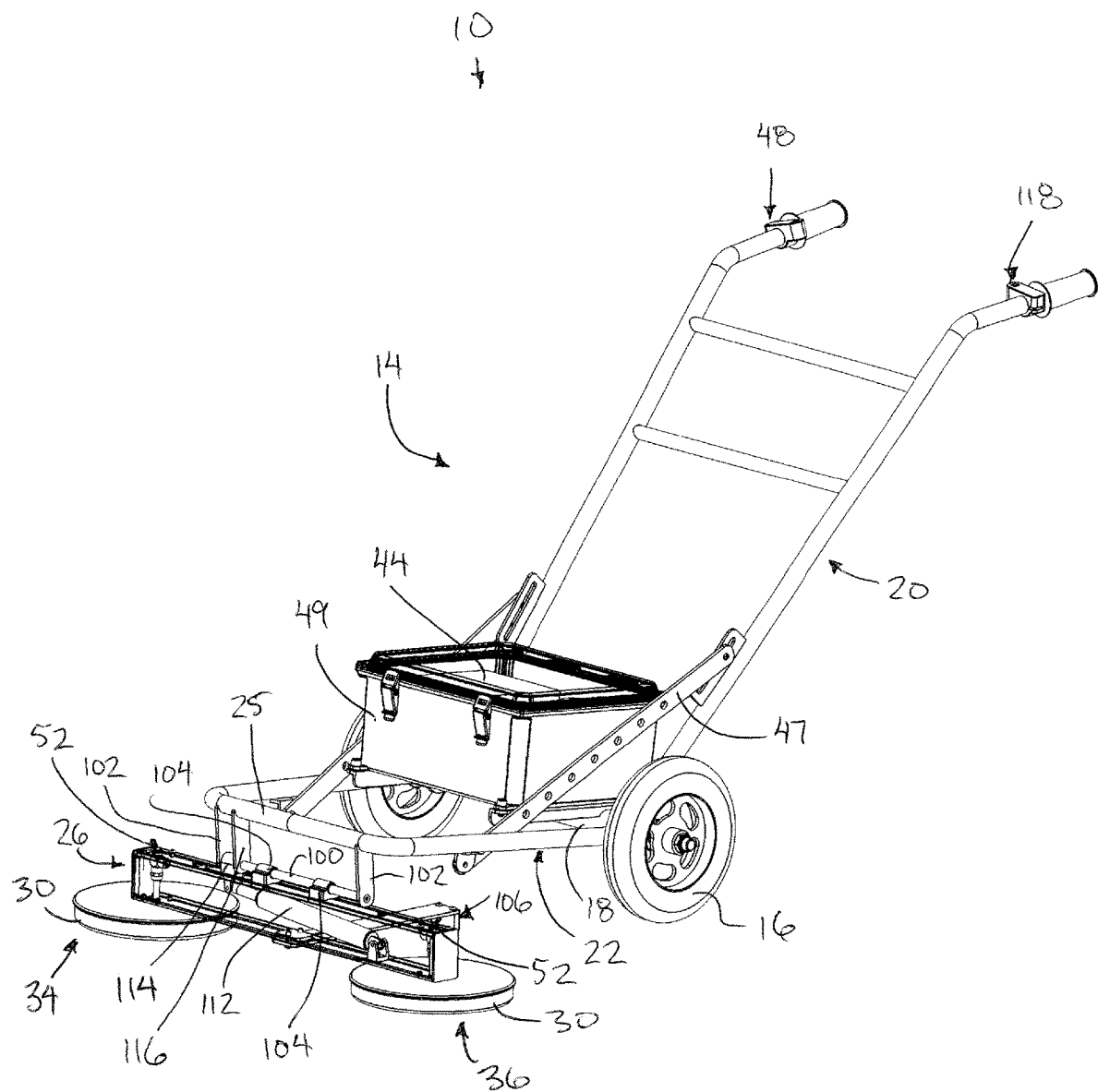
FIG. 9 is a perspective view of a third embodiment of the tile laying device.
Figure 10:
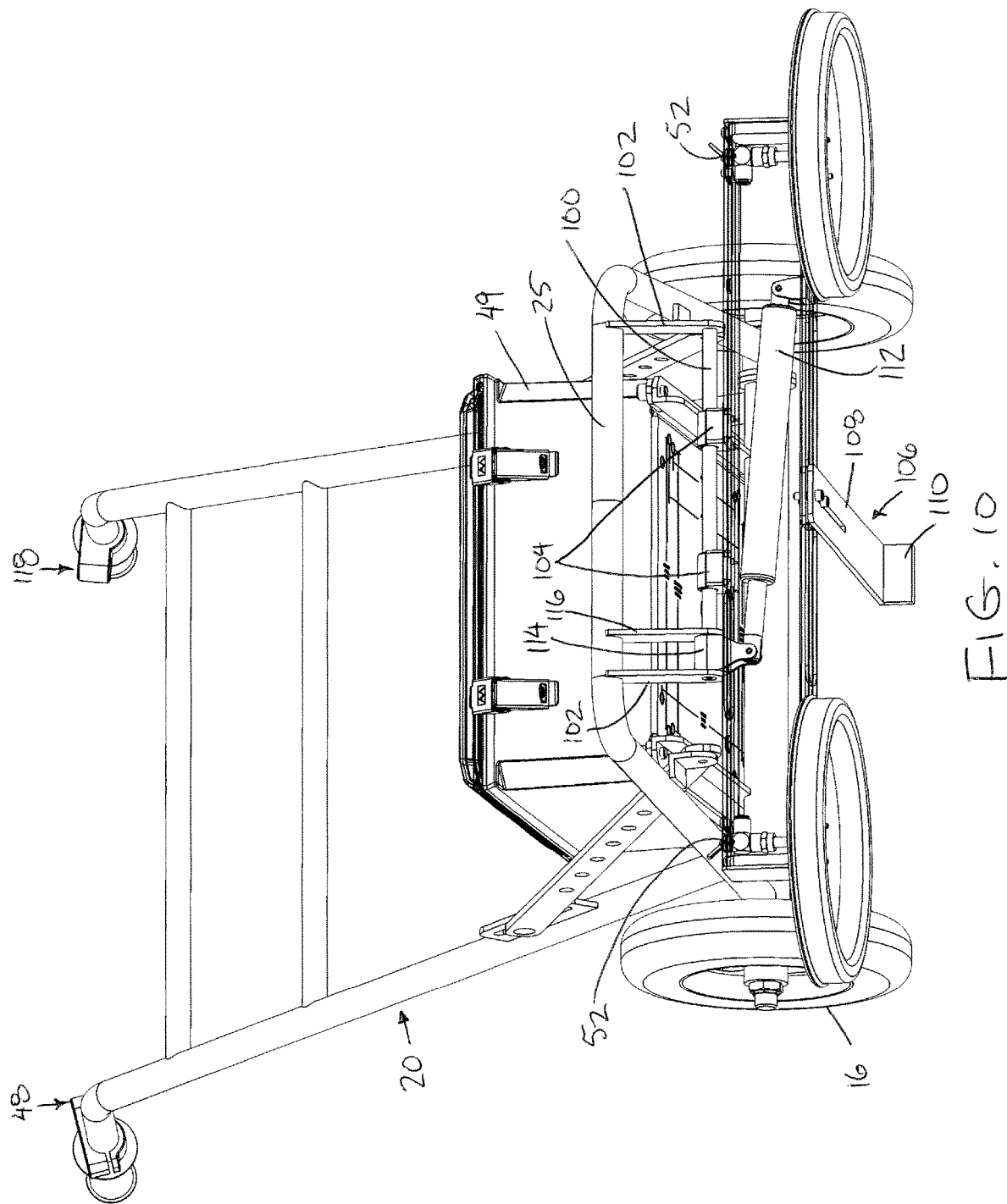
FIG. 10 is another perspective view of the third embodiment of the device according to FIG. 9.

Turning now to the embodiment of FIGS. 9 and 10, the tile laying device in this instance is substantially identical to the second embodiment of FIGS. 6 through 8 with regard to the configuration of the main frame 14 supported on wheels 16 and with regard to the handle frame portion 20 and base frame portion 22 which are coupled for angular adjustment relative to one another using braces 47. The tile laying device 10 in this instance also provides a housing 49 supporting the vacuum pump 44 therein for connection to suction cups 30 arranged in a first set 34 and a second set 36 using flexible branched lines 50 connected between a T-connector 51 and the respective sets of suction cups by three-way valves 52.

The embodiment of FIGS. 9 and 10 differs in that each set of suction cups in this instance comprises a single round suction cup 30 with a perimeter sealing member 32 for engaging the tile or tiles. This embodiment also differs in that the three-way valves 52 that allow the left and right suction cups to be independently operated are located at opposing ends of the main beam 28 of the pendulum frame respectively. In this embodiment, the pendulum frame also differs in the configuration of the lateral adjustment mechanism which allows the suction cups to be adjusted relative to the main frame in the lateral direction of the pendulum axis as described in further detail below.

The pendulum frame in this instance is supported by a shaft 100 which defines the pendulum axis and which is supported parallel and spaced below the cross bar 25 at the front end of the base frame portion 22 of the frame. Two legs 102 are provided at opposing ends of the shaft for being joined between the shaft and the cross bar 25 thereabove to support the shaft in fixed relation to the cross bar so that the shaft varies in height from the ground together with the cross bar 25 as the main frame is pivoted relative to the ground about the axis of the wheels 16 as described above with regard to the previous embodiments.

The pendulum frame in this instance again comprises a main beam 28 in the form of an elongate tube which is hollow and of rectangular cross-section so as to be elongate in the lateral direction of the pendulum axis. A pair of sliders 104 are fixedly mounted at laterally spaced positions at a central location on the top side of the main beam 28 in which each slider comprises a collar with a circular bushing therein supported on the circular cross-section of the shaft so as to be slidable in the lateral direction along the shaft 100 as well as being freely pivotal about the pendulum axis defined by the shaft. When the main beam is laterally centred relative to the main frame in the lateral direction of the pendulum axis, the two sliders 104 are each spaced axially inwards towards the centre of the shaft relative to the legs 102 such that the pendulum frame is laterally slidable from a centred position in either one of two opposing lateral directions.

The pendulum frame in this instance also includes a guide bar 106 which assists in aligning the suction cups 30 relative to a rear edge of the tile or tiles to be carried on the device. The guide bar includes a main portion 108 formed of a flat plate material which is elongate in a rearward direction to be coupled flat against the bottom side of the main beam 28 and to protrude rearwardly therefrom. The main portion 108 of the guide bar is parallel to a plane of the suction cups 30 at a location spaced slightly thereabove. A rear leg portion 110 of the guide bar extends downwardly from the rear edge of the main portion 108 in perpendicular relation thereto to terminate at a bottom edge which is in close proximity to the plane of the suction cups. The flat plate forming the rear leg portion is perpendicular to the plane of the cups and parallel to the pendulum axis. The rear leg portion is suited for abutment against the rear edge of a tile or tiles supported on the suction cups. The main portion 108 of the guide bar includes an elongate slot formed therein which receives a pair of fasteners used to fasten the guide bar to the bottom of the main beam 28 of the pendulum frame. Loosening the fasteners allows the guide bar to be longitudinally slidable for adjusting the distance of the rear leg portion 110 relative to the main beam 28 of the pendulum frame. Tightening the fasteners will frictionally lock the guide bar at a selected spacing of the rear leg portion 110 from the main beam corresponding to a desired size of tile to be carried on the device.

The lateral adjustment linkage for adjusting the position of the suction cups in the lateral direction of the pendulum axis relative to the main frame includes the sliders 104 which are axially slidable along the shaft 100 as well as a controllable actuator 112. The controllable actuator 112 is an electric linear actuator which can be actuated in either one of two opposing directions for extending or retracting the overall length of the actuator between opposing ends thereof. One end of the actuator 112 is pivotally coupled to a mounting collar 114 which is rotatably supported on the shaft 100 for free rotation thereon together with free pivotal movement of the pendulum frame on the shaft. The mounting collar 114 is constrained in the axial direction of the shaft between one of the legs 102 and the intermediate stop 116 in the form of an additional leg coupled between the cross bar 25 and the shaft 100. The collar fully occupies the axial space between the corresponding end leg 102 and the intermediate stop 116 such that the collar cannot be displaced axially along the shaft while remaining freely pivotal about the shaft.

The electric linear actuator is received within the hollow interior of the main beam 28 to extend generally in the lateral direction of the pendulum axis between a first end mounted on the mounting collar 114 and a second end pivotally coupled at a fixed mounting location relative to the main beam 28. In this manner, extending and retracting the length of the actuator 112 causes the main beam 28 to vary in lateral position relative to the mounting collar 114 which in turn causes the sliders 104 to be slidably displaced along the shaft.

A suitable two-way activation switch 118 is provided on one of the handles 42 of the handle frame such that actuation of the switch from the neutral position in a first direction provides electrical power to the actuator 112 to extend the actuator and laterally displace the pendulum frame in a first lateral direction from a centred position relative to the main frame. Likewise, actuation of the switch from the neutral position in a second direction provides electrical power to the actuator 112 to retract the actuator and laterally displace the pendulum frame in a second lateral direction from the centred position relative to the main frame.

A suitable vacuum actuation switch 48 is provided on the other handle 42 of the handle frame portion similar to the switch 48 described above in regard to the previous embodiments.

When using the tile laying device according to the third embodiment, the user first determines if one or both suction cups should be activated by the vacuum and the three-way valves 52 are appropriately set for activating one or both suction cups 38 respectively. When the user is ready to place a tile using the device, the device is positioned relative to a tile such that the rear leg portion 110 of the guide bar engages the rear edge of the tile and the suction cups engage the upper surface of the tile. Activating the vacuum pump using the power switch 48 will apply a vacuum pressure to the suction cups to retain the tile on the suction cups. The user can then pivot the main frame about the axis of the wheels to lift the tiles upwardly from the ground surface upon which the wheels roll while the freely pivoting pendulum frame ensures that the tiles remain generally horizontal in orientation. The operator then rolls the device along the ground on the wheels 16 up to the desired placement location for the tile. By rolling the wheels along the ground, the front and rear edges of the tile can be aligned with the desired placement location for the tile. Prior to releasing the tile, the switch 118 can also be used to control the actuator 112 for shifting the pendulum frame in the lateral direction relative to the main frame to also align laterally opposing ends of the tile with the desired placement location for the tile. Once the tile has been aligned with the desired placement location, the operator can use the switch 48 to release the vacuum pressure and release the tile from the suction cups.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A tile laying device for laying a tile, the device comprising:
    a main frame supported on transport wheels for rolling movement along a ground surface;
    at least one suction cup supported on the main frame and being operable so as to retain the tile thereon by vacuum pressure;
    a handle supported on the main frame;
    the main frame being supported for pivotal movement relative to the transport wheels about a pivot axis of the main frame between a laying position in which said at least one suction cup is substantially at a level of the ground surface and a transport position in which said at least one suction cup is spaced above the level of the ground surface;

the handle being pivotal with the main frame about the pivot axis and being positioned on the main frame so as to be readily gripped by hands of the operator throughout movement of the main frame between the laying position and the transport position;

an upright pendulum frame supporting said at least one suction cup thereon at a bottom end of the pendulum frame, the pendulum frame being supported on the main frame adjacent a top end of the pendulum frame at a location spaced above said at least one suction cup for free pivotal movement of the pendulum frame relative to the main frame about a pendulum axis oriented parallel to the pivot axis of the main frame such that the suction cups are arranged to remain balanced about the pendulum axis in a level orientation as the main frame is pivoted between the laying position and the transport position; and a lateral adjustment linkage coupled to the pendulum frame such that said at least one suction cup is adjustable in a direction of the pendulum axis relative to the main frame, the lateral adjustment linkage comprises a shaft supported on the main frame along the pendulum axis upon which the pendulum frame is pivotally supported and a controllable actuator for displacing the pendulum frame laterally in the direction of the pendulum axis relative to the shaft.

2. The device according to claim 1 wherein the transport wheels comprise two wheels supported for rolling movement about the pivot axis of the main frame.

3. The device according to claim 1 wherein said at least one suction cup comprises a plurality of suctions cups arranged to support a plurality of independent tiles thereon.

4. The device according to claim 1 wherein the controllable actuator is an electric actuator which can be actuated to displace the pendulum frame in either one of two opposing lateral directions along the shaft.

5. The device according to claim 1 wherein the pendulum frame comprises a header portion defining a top end of the pendulum frame and being supported on the main frame for pivotal movement about the pendulum axis, a footer portion defining a bottom end of the pendulum frame and supporting the suction cups thereon, and the lateral adjustment linkage comprises a pair of parallel link members pivotally coupled between the header portion above and the footer portion below about respective link axes which extend generally in a rolling direction of the wheels and which are arranged to be horizontally oriented in a balanced position of the pendulum frame about the pendulum axis.

6. The device according to claim 5 further comprising an actuator operatively connected to the pendulum frame so as to be arranged to control position of the parallel link members relative to the header portion of the pendulum frame and thereby control positioning of suction cups relative to the main frame in a lateral direction of the pivot axis of the main frame.

7. The device according to claim 6 wherein the handle includes a rotatable handle grip supported rotatably on the main frame and wherein the actuator comprises a dual cable actuator operatively connected between the rotatable handle grip on the main frame and the parallel link members such that a rotation of the handle grip in a first direction of rotation displaces the suction cups relative to main frame in a first lateral direction and a rotation of the handle grip in a second direction of rotation displaces the suction cups relative to main frame in a second lateral direction.

8. The device according to claim 1 further comprising:
a vacuum source supported on the main frame and arranged to produce a vacuum pressure; and
a controller operatively connected between the vacuum source and said at least one suction cup so as to be arranged to selectively apply the vacuum pressure to said at least one suction cup so as to selectively retain the tile on the main frame only when the vacuum pressure is applied to said at least one suction cup by the controller.

9. The device according to claim 8 wherein said at least one suction cup comprising a pair of suction cups arranged to be selectively disconnected from the vacuum source by the controller independently of one another.

10. The device according to claim 8 further comprising a handle grip on the main frame at a top end of the main frame for gripping by a user, a first actuator button on the main frame in proximity to the handle grip for operating the vacuum source to produce the vacuum pressure when depressed by the user, and a second actuator button on the main frame in proximity to the handle grip for operating a valve to release the vacuum pressure from the suction cups when depressed by the user.

11. The device according to claim 1 wherein the transport wheels are supported for rolling movement about the pivot axis of the main frame and wherein the main frame includes a first frame portion protruding forwardly from the pivot axis which supports said at least one suction cup thereon at a location spaced forwardly from the transport wheels and a second frame portion extending upwardly and rearwardly from the transport wheels to support the handle thereon.

12. The device according to claim 11 wherein the handle is supported at a top end of the second frame portion of the main frame.

13. The device according to claim 11 further comprising a vacuum pump arranged to supply a vacuum pressure to said at least one suction cup, the vacuum pump being supported on the first frame portion at a location which is forward of the pivot axis of the main frame.

14. The device according to claim 11 wherein the first and second frame portions are foldable relative to one another about the pivot axis of the main frame into a storage position to reduce an overall length of the main frame in a longitudinal direction of rolling movement of the wheels.

15. The device according to claim 14 further comprising a brace member arranged to be removably attached between the first and second frame portions in a working position in which the first and second frame portions are fixed at an obtuse angle relative to one another about the pivot axis, the brace member being adjustably mounted to at least one of the frame portions so as to vary the obtuse angle about which the first and second frame portions are fixed in the working position.

16. A tile laying device for laying a tile, the device comprising:
a main frame supported on transport wheels for rolling movement along a ground surface;
a shaft horizontally supported on the main frame so as to be adjustable in height relative to the ground surface;
a pendulum frame pivotally supported on the shaft for free pivotal movement of the pendulum frame relative to the main frame about a pendulum axis of the shaft;
at least one suction cup supported on the pendulum frame and being operable so as to retain the tile thereon by vacuum pressure; and
a lateral adjustment linkage coupled to the pendulum frame such that said at least one suction cup is adjustable in a direction of the pendulum axis relative to the main frame, the lateral adjustment linkage comprising a controllable actuator which is actuable to displace the pendulum frame laterally in the direction of the pendulum axis relative to the shaft in either one of two opposing lateral directions along the shaft.

* * * * *